United States Patent [19]

Bauer et al.

[11] 4,094,955

[45] June 13, 1978

[54] ACID PROCESS FOR RECOVERY OF ALUMINA FROM CLAY

[75] Inventors: Donald J. Bauer; Judith A. Eisele; Barlane R. Eichbaum, all of Reno, Nev.

[73] Assignee: The United States of America as represented by the Secretary of the Interior, Washington, D.C.

[21] Appl. No.: 809,882

[22] Filed: Jun. 24, 1977

[51] Int. Cl.² .......................... C01F 7/66; C01F 7/24
[52] U.S. Cl. .................................. 423/123; 423/125; 423/127; 423/132; 423/631
[58] Field of Search ............... 423/123, 125, 132, 631, 423/127

[56] References Cited

U.S. PATENT DOCUMENTS

| 1,413,754 | 4/1922 | Mejdell | 423/123 |
| 2,217,099 | 10/1940 | Burman | 423/123 |
| 3,366,446 | 1/1968 | Kelly et al. | 423/625 |
| 3,383,166 | 5/1968 | Gerry et al. | 423/123 |
| 3,387,921 | 6/1968 | Amano et al. | 423/123 |
| 3,647,373 | 3/1972 | Husker et al. | 423/631 |
| 3,864,462 | 2/1975 | Bruen et al. | 423/631 |
| 3,869,543 | 3/1975 | Schutte et al. | 423/631 |
| 4,044,115 | 8/1977 | Eisele et al. | 423/631 |

OTHER PUBLICATIONS

Lauer et al., "Chemical Engineering Techniques", Reinhold Publishing Corp., N.Y., 1952, pp. 220-222.
Olsen, "Unit Processes & Principles of Chemical Engineering", D. Van Nostrand Co., N.Y., 1932, pp. 1-3.

Primary Examiner—Herbert T. Carter
Attorney, Agent, or Firm—William S. Brown; Donald A. Gardiner

[57] ABSTRACT

Alumina monohydrate is produced by leaching calcined clay and subjecting the leach liquor to pressure hydrolysis wherein the vapor and heat resulting from the pressure hydrolysis are directly utilized for leaching of the calcined clay. The aluminum monohydrate may be roasted to yield alumina.

1 Claim, No Drawings

“ACID PROCESS FOR RECOVERY OF ALUMINA FROM CLAY

BACKGROUND OF THE INVENTION

1. Field of the Invention

This invention relates to the field of extractive metallurgy and is directed particularly to the recovery of alumina from clays. Specifically, the invention deals with the recovery of alumina from calcined clay by a pressure hydrolysis technique.

2. Description of the Prior Art

Prior art processes for recovering alumina from clays, such as kaolin, have conventionally involved the initial leaching of the calcined clay with a mineral acid, generally nitric acid, in order to dissolve the aluminum as aluminum nitrate. The iron contained within the clay is also leached and must be separated from the leach liquor prior to the recovery of the aluminum.

The resulting $Al(NO_3)_3 \cdot 9H_2O$ crystals are recovered from the purified leach liquor by removing enough water to cause crystallization when the solution is cooled. The $Al(NO_3)_3 \cdot 9H_2O$ can be decomposed to $Al_2O_3$ either by direct roasting or a two-step process wherein a basic aluminum nitrate is formed at a low temperature, around 150° C, and the basis nitrate is then roasted to $Al_2O_3$. The disadvantages of crystallizing $Al(NO_3)_3 \cdot 9H_2O$ and roasting it is that energy consumption is very large and a large heat input is required for vaporization of the excess water and for roasting the $Al(NO_3)_3 \cdot 9H_2O$.

Another process for making alumina monohydrate, ALOOH, as an intermediary product for the ultimate production of $Al_2O_3$ is disclosed by U.S. Patent Application Ser. No. 702,262, filed on July 2, 1976 and now U.S. Pat. No. 4,044,115. According to this process, the alumina monohydrate is produced directly from the purified aluminum nitrate leach liquor without evaporation of water, thereby substantially reducing energy consumption. In addition, the ALOOH may be roasted to $Al_2O_3$ with considerably less energy consumption than that required for roasting of $Al(NO_3)_3 \cdot 9H_2O$. This consists of treatment of the leach liquor, or other aluminum nitrate solution, at a temperature of about 250° to 350° C and a pressure of about 500 to 2500 psig for a time sufficient to convert a major proportion of the aluminum nitrate to alumina monohydrate according to the reaction $2Al(NO_3)_3(aq) + 4H_2O(lq) \rightarrow 2AlOOH(c) + 6 HNO_3 (aq)$.

Leach liquors suitable for treatment according to this process will typically consist essentially of aqueous solutions of aluminum nitrate nonahydrate containing about 0.5 to 7.2 weight percent of aluminum. The process is preferably carried out in an autoclave by means of which the required pressure is produced autogenously when the temperature is adjusted to the required value. Optimum reaction time will vary with temperature and pressure, as well as concentration of the solution, but generally a period between about 1 and 6 hours will be sufficient. The reaction mixture is then cooled to room temperature and the granular precipitate of AlOOH separated by conventional means such as filtration. The AlOOH may be readily converted to $Al_2O_3$ by roasting at a temperature of about 900° to 1300° C. The recovered $HNO_3$ can be recycled to leach additional clay.

Other examples of prior art processes for the production of alumina from clays are exemplified by U.S. Pat. No. 3,211,521 and U.S. Patent Application Ser. No. 639,024.

SUMMARY OF THE INVENTION

The present invention is directed to an improved process for the recovery of alumina from clays according to a pressure hydrolysis technique wherein the vapors and heat from pressure hydrolysis are directed into a chamber containing the calcined clay for the purpose of leaching the clay and solubilizing alumina in the calcined clay, thus increasing the yield of aluminum monohydrate which may subsequently be roasted to produce alumina.

It is an object of the invention to provide a more efficient technique for the recovery of alumina from clays.

It is another object of the invention to provide an improved technique for increasing the recovery of aluminum monohydrate in a pressure-hydrolysis system.

It is yet another object of the invention to provide a more direct and lower energy consumption technique for recovering alumina from calcined clay.

These and other objects of the invention will become apparent from the following detailed description thereof.

DETAILED DESCRIPTION OF THE PREFERRED EMBODIMENTS

Previous methods for producing alumina from clays involved the nitric acid leaching of calcined clay and relied upon evaporation-crystallization of the iron-free aluminum nitrate solution to produce $Al(NO_3)_3 \cdot 9H_2O$ for subsequent thermal decomposition. The nitric acid recovered from the thermal decomposition step was recovered and recycled to the clay leaching step.

A modification of this technique involves subjecting the iron-free aluminum nitrate solution to elevated temperature and pressure in order to precipitate AlOOH for subsequent calcination to alumina. The resulting nitrogen oxides and nitric acid are collected and recycled to the leaching step. Recovery of AlOOH according to this technique is generally only on the order of about 70%.

However, the present invention has discovered that the utility of the pressure-hydrolysis technique can be significantly improved by discharging the evolved nitric acid, nitrogen oxides and steam into a chamber containing the calcined clay. This is found to result in a more direct and more efficient use of the nitric acid, nitrogen oxides and steam to solubilize alumina in the calcined clay and increase the yield of AlOOH in the pressure-hydrolysis system.

As an example of the improved technique of the present invention, two autoclaves, A-1 and A-2, were connected together by a valved transfer line. Autoclave A-1 served as the pressure hydrolysis stage and autoclave A-2 served as the leach stage of the system. One hundred twenty-eight grams of $A-1(NO_3)_3$ in 222 grams of $H_2O$ were heated in Al for 3 hours at 310° C. Calcined clay and water were placed in A-3. The system developed 1500 psi pressure with the valve between A-1 and A-2 being closed. At this pressure, the valve was opened and the volatile contents of A-1, comprising primarily $HNO_3$, flashed into A-2, the latter autoclave having been preheated to 100° C at 10 psi pressure.

The crystalline material removed from A-1 was identified as AlOOH alumina monohydrate. Essentially complete recovery was obtained and no nitrogen was detected in the product. The calcined clay slurry or leach liquor produced in A-2 was filtered and washed. Eighty-six percent of the aluminum was recovered in solution from A-2 in the form of $Al(NO_3)_3 \cdot 9H_2O$.

This process may be conducted within a temperature range of approximately 250°–350° C and within a pressure range of approximately 500–2500 psi for the pressure hydrolysis stage.

Optimum reaction time varies with temperature and pressure, as well as concentration of the solution, but generally a period of about 1 to 6 hours will be sufficient for the pressure hydrolysis.

The method of the invention eliminates evaporation and crystallization in order to produce $Al(NO_3)_3 \cdot 9H_2O$ and instead provides for the production of AlOOH in one step. Furthermore, the vapors and heat from the pressure hydrolysis are utilized directly for leaching more calcined clay. The resulting AlOOH may subsequently be roasted at a temperature of approximately 900°–1300° C to produce $Al_2O_3$.

Therefore, the present invention provides an improved technique for the recovery of AlOOH by pressure hydrolysis wherein efficiency of operation and recovery are realized by the direct utilization of vapors and heat from the pressure hydrolysis for leaching the calcined clay.

It is to be understood that the forms of the invention herewith described are to be taken as preferred examples of the same and that various changes may be resorted to without departing from the spirit of the invention or scope of the subjoined claims.

We claim:

1. A method for production of alumina monohydrate comprising:

forming an aqueous leach solution of aluminum nitrate by leaching calcined clay with nitric acid, treating the leach solution to remove iron impurity, subjecting the iron-free aluminum nitrate solution to a pressure hydrolysis treatment at a temperature of about 250° to 350° C and a pressure of about 500 to 2500 psig for a time sufficient to convert a major proportion of the nitrate to monohydrate, discharging the volatiles and heat resulting from the pressure hydrolysis treatment into a chamber containing calcined clay and water, whereby the calcined clay is leached to produce an aqueous leach solution of aluminum nitrate.

* * * * *